E. WASHINGTON.
TROLLEY.
APPLICATION FILED AUG. 1, 1912.
1,083,715. Patented Jan. 6, 1914.
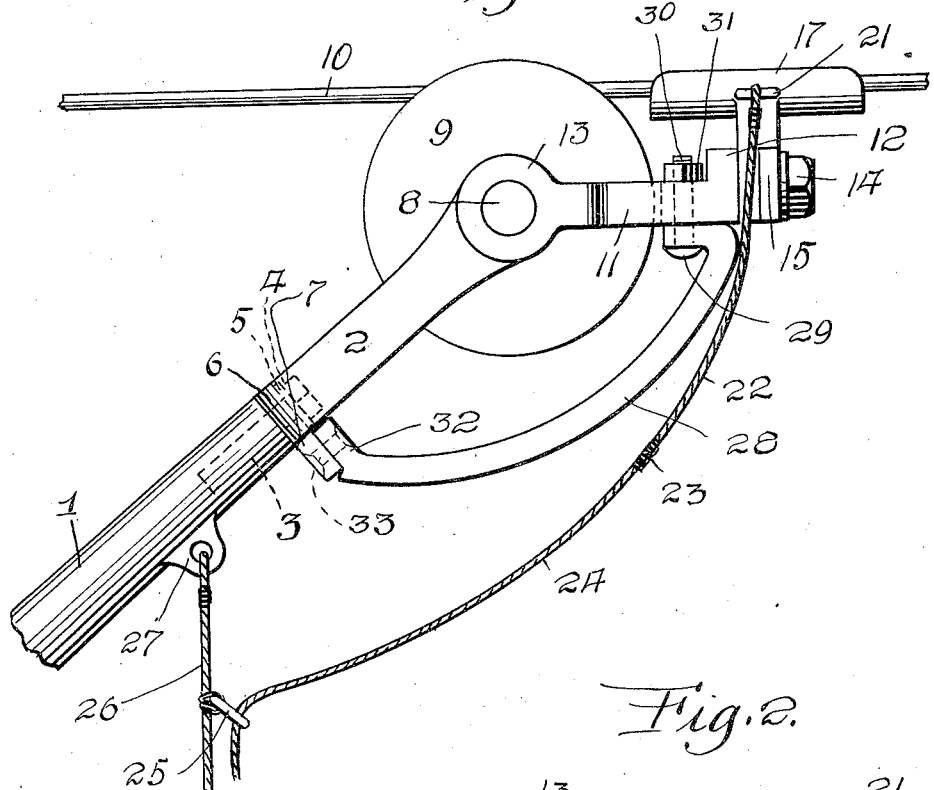
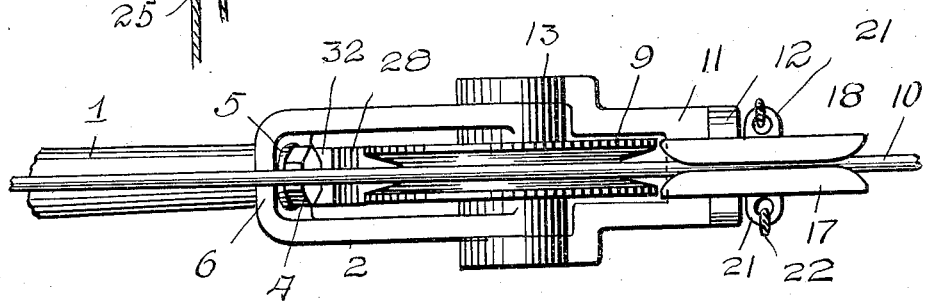
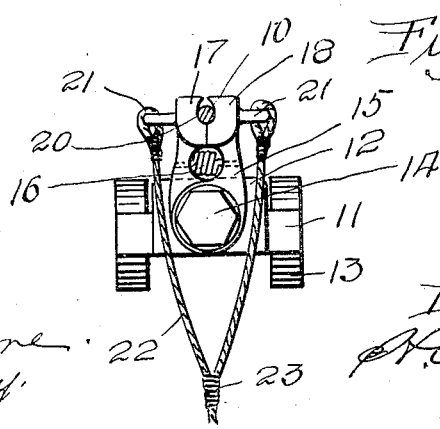
WITNESSES
Samuel Payne
J. Stephany
INVENTOR
E. Washington
ATTORNEYS

UNITED STATES PATENT OFFICE.

EUGENE WASHINGTON, OF PITTSBURGH, PENNSYLVANIA.

TROLLEY.

1,083,715.            Specification of Letters Patent.            Patented Jan. 6, 1914.

Application filed August 1, 1912.   Serial No. 712,701.

*To all whom it may concern:*

Be it known that I, EUGENE WASHINGTON, a citizen of the United States of America, residing at Pittsburgh, in the county of Allegheny and State of Pennsylvania, have invented certain new and useful Improvements in Trolleys, of which the following is a specification, reference being had therein to the accompanying drawing.

This invention relates to trolleys, and has for its object to provide a device of such class in a manner as hereinafter set forth for maintaining the trolley wheel in contact with the trolley wire and to furthermore provide the device with means in a manner as hereinafter set forth to permit of the trolley wheel being conveniently disconnected from the wire when occasion so requires.

Further objects of the invention are to provide a trolley which is comparatively simple in its construction and arrangement, strong, durable, efficient in its use, readily set up and comparatively inexpensive to manufacture.

With the foregoing and other objects in view the invention consists of the novel construction, combination and arrangement of parts as hereinafter more specifically described and illustrated in the accompanying drawing wherein is shown an embodiment of the invention, but it is to be understood that changes, variations and modifications can be resorted to which come within the scope of the claim hereunto appended.

In the drawing:—Figure 1 is a side elevation of a trolley in accordance with this invention showing the adaptation thereof in connection with a trolley wire, Fig. 2 is a top plan view thereof, and Fig. 3 is a rear elevation.

Referring to the drawing in detail: 1 denotes the pole to which a harp 2 is swivelly connected by means of a bolt 3 secured in and projecting from the upper end of the pole 1. The head of the bolt is indicated by the reference character 4 and has abutting thereagainst a washer 5. The bolt 3 extends through the base 6 of the harp 2, the washer 5 engaging the base, as clearly shown in Fig. 2. The arrangement of the head 4 of the bolt 3 and washer 5 with respect to the base 6 of the harp swivelly connects the latter upon the upper end of the pole. The base 6 of the harp 2 is provided with a rearwardly extending supporting arm 7 for a purpose which will be presently referred to. Journaled in the harp 2, upon the shaft 8 is a trolley wheel 9 which travels in engagement with the trolley wire 10. The shaft 8 is fixed in the free ends of the arms of the harp 2 and is of a length as to project outwardly from the arms of the harp. Projecting rearwardly from the harp 2 and disposed parallel with the trolley wire 10 is a yoke-shaped support 11 having one end thereof formed with a vertically disposed and transversely extending lug 12 which constitutes a bearing for a purpose to be presently referred to. The forward portion of the support 11 has the arms thereof offset and enlarged, as at 13 and which are mounted upon the projecting ends of the shaft 8. Fixedly secured in the rear end of the support 11 and also in the lug 12 is a headed bolt 14 upon which is mounted a pair of vertically disposed supporting arms 15, these latter having the lower ends opposing each other, as clearly illustrated in Fig. 1 and said lower ends of the arms 15 are interposed between the rear end of the support 11, the lug 12 and the head of the bolt 14. The rear end of the support 11 and the rear face of the lug 12 and inner face of the bolt 14 provide bearings for the lower ends of the arms 15. The arms 15 are normally drawn toward each other through the medium of a retractile spring 16 which is interposed between said arms and has the ends thereof fixedly connected to the arms as clearly illustrated in Fig. 3. Each of the arms 15 carries one section of a combined retaining and guiding device, the function of which is to maintain the wheel 9 in engagement with the wire 10 as well as provide means for guiding the wheel 9.

The sections of the combined retaining and guiding device are indicated by the reference characters 17, 18 and each has its inner face grooved, as at 20, the groove being of such shape that the wall thereof will overlap the wire 10 so that when said device is in operative position it will be detachably connected to the wire 10, to freely travel thereagainst during the travel of the trolley wheel 9. The spring 16 not only maintains the arms 15 closed but further constitutes a means for maintaining the sections 17, 18 in engagement with the trolley wire 10. Each of the sections 17, 18 is formed with a laterally extending apertured lug 21 to which is attached the upper end of a flexible member 22. These members are connected together at their lower ends, as at 23 and also to a pulling cable 24, the latter extending through an eye 25 carried by the trolley rope 26, which is attached to an apertured lug 27 projecting from the pole 1.

The yoke-shaped support 11 is braced and maintained in parallelism with the wire 10 through the medium of a curved brace member 28 which has a forwardly projecting and angularly disposed upper end 29 arranged against the lower face of the support 11. The end 29 of the member 28 is fixedly secured to the support 11 by a headed bolt 30 and a nut 31. The bolt extending through the end 29 and also through the support 11 as clearly shown in Fig. 1. The lower end of the member 28 is angularly disposed, as at 32, and is seated upon the arm 7 as well as being riveted thereto, as at 33. When the elements of the trolley are positioned as shown in Fig. 1 and it is desired to lower the trolley, the sections 17 and 18 are shifted apart through the medium of the members 22 and 24 and against the action of the spring 16. The trolley can be lowered by pulling downwardly upon the rope 26. When the trolley is connected to the wire the sections 17, 18 of the retaining and guiding device are separated until the wire 10 is positioned between said sections, then the elements 24 and 22 are released and the spring 16 causes the sections 17, 18 to move into abutting engagement and overlap the wire 10 whereby the wheel 9 will be maintained in engagement with the wire 10 as is obvious.

What I claim is:—

A trolley comprising the combination with a pole, a harp carried thereby and an angularly disposed and rearwardly extending support projecting from the upper end of the harp, of a pair of longitudinally extending combined guide and retaining members adapted to overlap the trolley wires, a pair of vertically extending spring controlled elements supporting said members and having their lower ends pivotally connected to the rear end of said support, means connected to said elements for shifting them thereby moving said members free of the wire, a rearwardly extending arm arranged at the lower end of the harp and disposed at a downward inclination, a curved rigid brace member arranged rearwardly of the pole and having a shouldered lower end abutting against and overlapping said arm, means for fixedly securing the lower end of said brace to said arm, said brace having its upper end angularly disposed and positioned against the lower face of said support, means for fixing the upper end of said brace to said support whereby the latter is maintained parallel with the trolley wire, and a wheel mounted in said harp.

In testimony whereof I affix my signature in the presence of two witnesses.

EUGENE WASHINGTON.

Witnesses:
MAX H. SROLOVITZ,
KATHERINE ERRETT.

---

Copies of this patent may be obtained for five cents each, by addressing the "Commissioner of Patents, Washington, D. C."